United States Patent Office 3,527,728
Patented Sept. 8, 1970

3,527,728
PAPER RELEASE COATING COMPRISING POLY-SILOXANES, ORGANOTIN COMPOUNDS, AND ORGANIC AMINES
Robert Muir Gibbon, West Kilbride, and Edward Keith Pierpoint, Largs, Scotland, assignors to Imperial Chemical Industries Limited, London, England, a corporation of Great Britain
No Drawing. Filed Feb. 9, 1968, Ser. No. 704,231
Int. Cl. C08g $51/36, 31/02$
U.S. Cl. 260—31.2          22 Claims

ABSTRACT OF THE DISCLOSURE

A composition suitable for treatment of paper and the like to improve release properties and abrasion resistance containing a diorganopolysiloxane, a polysiloxane having not less than three silicon-bonded hydrogen atoms per molecule and at least three different silicon atoms therein having a hydrogen atom attached thereto, an organotin compound and an organic amine having a basic disassociation constant in aqueous solution of not less than $10^{-9}$.

---

This invention relates to new and useful organosilicon compositions and especially to such compositions which are particularly useful in the treatment of paper and the like to give a finish having good release properties.

A wide variety of organosilicon compositions have been used to treat paper and the like to give good release properties, for example, so that the paper can be used as a removable backing for materials such as paper, fabrics and plastic films coated with pressure sensitive and like adhesives. Included among the compositions used for this purpose have been mixtures of hydroxy-containing diorganopolysiloxanes and polysiloxanes having a proportion of silicon-bonded hydrogen atoms with sundry other ingredients including a catalyst which may be, for example, a tin acylate such as dibutyltin diacetate or an amine. The compositions hitherto used have not in all cases been entirely satisfactory for one or more of a variety of reasons including, for example, such as too slow curing, too high curing temperatures, unsatisfactory release properties in the final product and lack of resistance to abrasion of the final coating.

According to the present invention a new and improved composition suitable for treatment of paper and the like to give a good release finish comprises 100 parts by weight of a diorganopolysiloxane soluble in organic solvents and containing at least two silicon-bonded hydroxyl groups, 1 to 25 parts by weight of a liquid polysiloxane having not less than three silicon-bonded hydrogen atoms per molecule and at least three different silicon atoms having a hydrogen atom attached thereto, 2 to 20 parts by weight of an organotin compound soluble in organic solvents, as hereinafter defined, and from 0.2 to 15 parts by weight of an amine having a basic dissociation constant in aqueous solution of not less than $10^{-9}$.

The diorganopolysiloxane containing silicon-bonded hydroxyl groups may vary widely in viscosity, for example, from $3 \times 10^3$ to $10^8$ cs. at 25° C. or may be of higher viscosity. It is, however, generally preferred that it be of viscosity from $5 \times 10^5$ to $5 \times 10^7$ cs. at 25° C. It may have only two silicon-bonded hydroxyl groups per molecule or alternatively it may have more than two hydroxyl groups, one or more or none of which may be attached to a terminal silicon atom. The organo groups therein may be substituted or unsubstituted alkyl, aryl, alkaryl, aralkyl, alkenyl, cycloalkyl or cycloalkenyl groups. Substituted groups include, for example, the fluoroalkyl groups. Suitable groups include, for example, methyl, ethyl, phenyl, benzyl, vinyl, cyclohexyl, trifluoropropyl and cyclohexenyl groups. In many cases it is preferred that at least the major proportion of the organo groups be methyl groups and it is frequently preferred that all the organo groups be methyl groups. The hydroxyl-containing diorganopolysiloxanes are essentially linear polysiloxanes. They may, however, contain small amounts of groups other than the diorganosiloxanyl groups forming the chain. Thus, for example, there may be small proportions of groups containing trifunctional silicon atoms such as, for examples, those of formula $CH_3SiO_{1.5}$ and similar groups. Other groups or linkages which may be present in small amounts include, for example, silmethylene groups and Si—Si linkages. Small proportions of such groups may be present in commercial diorganopolysiloxanes because of their having been present in the chlorosilanes which were hydrolysed and condensed in the preparation of the diorganopolysiloxanes.

Methods of preparing diorganopolysiloxanes containing silicon-bonded hydroxyl groups are, of course, well known and widely described. The particular method used for the diorganopolysiloxane to be used in the compositions of our invention is inconsequential, provided that the necessary final characteristics are present.

The liquid polysiloxane containing silicon-bonded hydrogen atoms, which is essentially linear or cyclic and is preferably linear, may be, for example, of viscosity not greater than 2000 cs. at 25° C. It is, however, preferably of viscosity from 5 to 200 cs. at 25° C. The ratio of silicon-bonded hydrogen atoms to silicon atoms may vary widely, for example from 1:5 to 1:1, and is preferably not less than 1:3. In many cases it is further preferred that there be 1 silicon-bonded hydrogen atom for every non-terminal silicon atom in the polysiloxane. The terminal silicon atoms may have a hydrogen or a hydroxyl group attached thereto. In general, however, the groups attached to terminal silicon atoms will be hydrocarbyl groups. The overall ratio of silicon-bonded hydrogen atoms plus organo groups to silicon atoms will normally be from 1.9:1 to 2.2:1. The organo groups present may be alkyl, aryl, alkaryl, aralkyl, alkenyl, cycloalkyl or cycloalkenyl groups. There may also be present small amounts of alkoxy or aroxy groups. Suitable groups include, for example, methyl, ethyl and phenyl groups. In many cases it is preferred that at least the major proportion of the organo groups be methyl groups and it is frequently preferred that they all be methyl groups.

While the proportion of liquid polysiloxane containing silicon-bonded hydrogen atoms may vary from 1 to 25 parts by weight per 100 parts by weight of hydroxy-containing diorganopolysiloxane, it is in general preferred to use from 2 to 15 parts by weight. It is also, in many cases, particularly preferred to use from 3 to 10 parts by weight.

The proportion of organotin compound which may be used may, as stated, vary from 2 to 20 parts by weight per 100 parts by weight of hydroxy-containing diorganopolysiloxanes. It is, however, in general preferred to use from 3 to 10 parts and it is frequently further preferred to use 4 to 8 parts by weight.

By the phrase "organotin compound soluble in an organic solvent" as used throughout this specification, we mean an organic solvent soluble compound selected from the following classes:

(1) *Diorganotin acylates* in which the acyl group is derived from a monovalent acid and is a mononuclear aromatic group or an aliphatic group having not more than four carbon atoms and which may or may not contain substitutents.

(2) *Diorganotin alkoxides*
(3) *Diorganotin phenoxides*
(4) *Diorganodioximotins*
(5) *Dioximopolydiorganostannoxanes*
(6) *Diacylpolydiorganostannoxanes*

Mixtures of one or more of such classes are also included.

The organo groups of the diorgano portions of the tin compound may be, for example, alkyl or aryl groups but are preferably alkyl groups. Suitable organo groups include, for example, n-butyl and n-octyl groups.

The acyl groups in the diorganotin acylates may be substituted or unsubstituted groups such as, for example, formyl, acetyl, propionyl, benzoyl, monochloroacetyl, monochlorobenzoyl, phenylacetyl, crotonyl and cinnamoyl groups.

For some purposes it is preferred that the diorganotin compound be a diorganotin acylate and of the acylates dibutyltin diacetate and dioctyltin diacetate are particularly preferred. The acylates may be made, for example, by reacting together a diorganotin oxide such as dibutyltin oxide or dioctyltin oxide with a suitable acid such as acetic acid by heating in an organic solvent such as toluene, the proportion of reactants being such that there are present two carboxy groups per atom of tin. The water formed during the reaction is removed, for example, by azeotropic distillation and there is thus obtained a solution of the diorganotin acylate. Substituents which may be present in the acyl groups include, for example, halogens such as chlorine and hydrocarbyloxy groups. Suitable diorganotin acylates include, for example, dibutyltin diformate, dibutyltin diacetate, dibutyltin dipropionate, dibutyltin dibenzoate, dibutyltin diphenylacetate, dibutyltin bis(monochloroacetate), dibutyltin dicrotonate, dioctyltin diformate, dioctyltin diacetate, dioctyltin dipropionate, dioctyltin dibenzoate, dioctyltin diphenylacetate, dioctyltin bis(monochloroacetate) and dioctyltin dicrotonate.

The alkoxy groups present in the diorganotin alkoxides preferably contain not more than 10 carbon atoms. Suitable alkoxy groups include, for example, methoxy, ethoxy and n-butoxy groups. Suitable diorganotin alkoxides include, for example, dibutyltin dimethoxide, dioctyltin dimethoxide and dibutyltin dibutoxide.

Phenoxy groups which may be present in the diorganotin phenoxides are in general preferably derived from a monohydric phenol. Suitable phenoxy groups include, for example, phenoxy, 4-chlorophenoxy and 4-methylphenoxy groups. Suitable diorganotin phenoxides include, for example, di-n-butyltin diphenoxide and di-n-octyltin diphenoxide.

The oximo group in the diorganodioximotins may be derived from, for example, benzaldoxime, benzophenoxime, acetophenoxime, acetoxime and acetaldoxime. Suitable diorganodioximotins include, for example, dibutyldibenzaldoximotin, dioctyldibenzophenoximotin, dibutyldibenzophenoximotin and dioctyldibenzaldoximotin. These materials may be prepared by reacting a diorganotin oxide, for example, such as dibutyltin oxide with an aldoxime or ketoxime, for example, such as benzaldoxime, benzophenoxime, acetophenoxime, acetaldoxime and acetoxime, there being used two moles of the oxime per g. atom of tin.

The oximo group present in the dioximopolydiorganostannoxane may be the same as those present in the diorganodioximotins. The dioximopolydiorganostannoxane may be prepared in a similar manner to that in which the diorganodioximotins are prepared except that there should be used only one mole or less of the oxime per g. atom of tin. The products of the reactions are not necessarily single chemical compounds but may be mixtures of two or more dioximopolydiorganostannoxanes.

The acyl groups in the diacylpolydiorganostannoxanes may be the same as those present in the diorganotin acylates. These products may be prepared in a manner similar to that of the diorganotin acylates except that there should be used amounts of acids such that there is only one or less carboxylic group per g. atom of tin.

Preferred organotin compounds are dibutyltin diacetate, dioctyltin diacetate, the diacetoxytetra-alkyldistannoxane prepared by reaction of acetic acid with dibuytltin oxide or diocyltin oxide, the amount of acid being such that there is one mole thereof per g. atom of tin and the dibenzaldoximodialkyltin prepared by reaction of dibutyltin oxide or dioctyltin oxide with benzaldoxime using 1 mole of benzaldoxime per g. atom of tin.

While the proportion of the amine used may, as stated, vary from 0.2 to 15 parts by weight per 100 parts by weight of the hydroxy-containing diorganopolysiloxane, it is generally preferred to use from 0.5 to 10 parts. The amount used will normally depend on the molecular weight and nature of the amine since it is generally preferred that the atomic ratio of nitrogen in the amine to tin in the tin compound should be from 0.5:1 to 5:1. The amine may be any organic amine having a basic dissociation constant of not less than $10^{-9}$ and soluble in the solvent used and may be a primary, secondary or tertiary amine or a polyamine and may be substittued or unsubstituted. Substituents which may be present include, for example, hydroxyl, alkoxyl, alkylamino, alkenyl, carboethoxy, trialkylsilyl, aralky and aryl groups.

It is also frequency preferred that the basic dissociation constant of the amine in aqueous solution be not less than $10^{-5}$. Suitable amines which may be used include, for example, methylamine, ethylamine, n-butylamine, diethylamine, triethylamine, n-octylamine, benzylamine, allylamine, 2-amino-ethanol, 2-aminopropanol, 2-aminobutanol, tirethanolamine, ethylene-diamine, diethylenetriamine, triethylene tetramine, tetraethylenepentamine, triethylenediamine, trimethyl-T-aminopropylsilane, trimethyl-δ-aminobutylsilane, N,N-diethylhydroamine and N,N-diethylaminoethanol. In many cases, however, triethylenetetramine and tetraethylenepentamine are preferred.

The preferred compositions of our invention have an adequate pot-life which can be varied by choice of the specific ingredients and their proportions, for example up to 8 days if maintained at temperatures not greater than, for example, 25° C. Such pot-lives are greatly in excess of those of the hitherto available compositions used for similar purposes. Our compositions may be applied to the paper or other material to be treated by any of the well known conventional processes such as, for example, dipping, spraying, knife and roller coating.

The compositions are normally preferably used in the form of a solution in an organic solvent. The concentration of the composition in the solvent may vary widely, for example from about 1 to about 30 percent by weight. In general, concentrations from about 3 to about 10 percent are preferred. The conventional solvents such as aromatic and aliphatic hydrocarbons, chlorinated aliphatic hydrocarbons, ketones, esters, ethers, white spirit and other pretroleum fractions may be used. Suitable solvents include, for example, benzene, toluene, xylene, trichloroethylene, perchlorethylene, methylene chloride, methylethyl ketone, acetone, ethyl acetate and white spirit, and mixtures of one or more of these.

After the compositions have been applied to the paper or other material any solvent present is removed by volatilisation and the composition cured, for example, by exposure to an elevated temperature for a short period, for example from 100° C. upwards for about 30 seconds or less. In general, of course, the time required will be inversely proportional to the temperature. The temperature naturally should not be high enough to damage the treated paper or other material.

In fact, one of the more important advantages of our compositions is that they have a rapid rate of cure at conventional curing temperatures, for example, 15 seconds at 120° C.

While the compositions of our invention are useful for a variety of purposes, their outstanding advantages are fully obtained when used to coat paper and plastic films such as, for example, films of polyolefins such as polyethylene or polypropylene, polyesters such as polyethyleneterephthalate and other polymers such as polyvinyl chloride and polyvinylidine chloride and confer thereon release properties such as are required when the paper or film is to be used as a backing for a fabric or material coated with a pressure sensitive adhesive.

Our invention is further illustrated by the following examples in which all parts and percentages are by weight.

EXAMPLE 1

15 parts of a 50 percent solution of dibutyltin diacetate in toluene were added to a solution of 100 parts of a hydroxy-ended dimethylpolysiloxane of viscosity $1 \times 10^7$ cs. at 25° C. and 6 parts of a trimethylsilyl-ended methylhydrogenpolysiloxane liquid of viscosity 20 cs. at 25° C., in 954 parts of toluene. The mixture was stirred to disperse the tin catalyst. Immediately thereafter there were added to the mixture 5.7 parts of a 10 percent solution of tetraethylenepentamine in toluene. The N/Sn atomic ratio in this composition was 0.7:1.

A vegetable parchment paper was coated with the so prepared solution to a silicone content of 0.75 g./m². The composition was cured by heating for 30 seconds at 120° C. in an oven fitted with forced air circulation. The resulting silicone coating was highly abrasion resistant and could not be removed from the surface by vigorous rubbing with the finger and also provided an excellent release surface against pressure sensitive adhesives. The catalysed solution was still usable after 24 hours.

For purposes of comparison a solution of similar composition, differing only in that the tetraethylenepentamine was omitted, was used to treat the same vegetable parchment and cured at 120° C. for 30 seconds. This gave a silicone film that was removable from the surface by two or three rubs with a finger. The solution also gelled within 2 hours.

EXAMPLE 2

14 parts of a 50 percent solution of dibutyltin diacetate and 6 parts of a 10 percent solution of tetraethylenepentamine in toluene were added to a solution of 100 parts of the hydroxy-ended dimethylpolysiloxane and 1.0 part of the methylhydrogenpolysiloxane liquid used in Example 1 in 909 parts of toluene. The N/Sn atomic ratio in this composition was 0.8:1. Vegetable parchment was coated with the so prepared solution and the coating composition cured by heating at 120° C. for 30 seconds. The resulting coating smeared slightly on rubbing with a finger but after standing for 24 hours at 18° C., it no longer smeared and resisted vigorous rubbing with a finger.

EXAMPLE 3

14.6 parts of a 50 percent solution in toluene of dibutyltin diacetate were stirred into 100 parts of the dimethylpolysiloxane and 6 parts of the methylhydrogenpolysiloxane used in Example 1 dissolved in 954 parts of toluene. Immediately afterwards 21 parts of a 10 percent solution of tetraethylenepentamine in toluene were added with stirring. The N/Sn atomic ratio in this composition was 2.7:1. Vegetable parchment was treated with the so prepared solution and the composition cured in the manner described in Example 1. The film obtained was very resistant to rubbing with a finger and gave good release of pressure sensitive adhesives. The solution remained usable and maintained its rapid curing properties for several days.

EXAMPLE 4

The procedure of Example 3 was repeated except that 2.1 parts of a 10 percent solution of tetraethylenepentamine were added instead of the 21 parts of the same solution. In this case the N/Sn atomic ratio was 0.27:1. The so prepared solution noticeably increased in viscosity during the first hour after preparation and had gelled within three hours. Paper coated with this solution during the first hour after preparation gave good abrasion resistant coatings after a cure of 30 seconds at 120° C. Thus, while the solution is not such as to give the full advantages of our invention, it is of value in cases where a short pot life is adequate.

EXAMPLE 5

A solution of 200 parts of the hydroxy-ended dimethylpolysiloxane and 12 parts of the methylhydrogensiloxane used in Example 1 in 1908 parts of toluene was divided into two equal portions, A and B. To portion A there were added 20 parts of a 50 percent solution of dioctyltin diacetate in toluene followed by 10 parts of a 10 percent solution of tetraethylenepentamine in toluene. To solution B there were added 15 parts of a 50 percent solution of dibutyltin dipropionate in toluene followed by 10 parts of a 10 percent solution of tetraethylenepentamine in toluene. Vegetable parchment treated in the manner described in Example 1 with one each of the two so prepared solutions was found to have strong coatings which were very resistant to rubbing with a finger and which gave good release of pressure sensitive adhesives.

EXAMPLE 6

The procedure of Example 1 was repeated, except that the amine used therein was replaced by the amines listed below using the parts shown.

| Amine | Parts | N/Sn atomic ratio |
|---|---|---|
| Aminobutanol | 5.2 | 2.9 |
| Allylamine | 4.2 | 3.5 |
| Benzylamine | 10.5 | 4.7 |
| n-Butylamine | 5.4 | 3.7 |
| Diethylamine | 5.4 | 3.7 |
| n-Octylamine | 11.5 | 4.25 |
| Piperidine | 3.2 | 1.8 |
| Triethanolamine | 10.5 | 3.4 |
| Triethylenediamine | 7.3 | 2.7 |
| Tetramethylguanidine | 2.0 | 2.6 |

All of the compositions when coated on paper and cured in the manner described in Example 1 gave coatings which were extremely resistant to abrasion by the finger. All of the coated papers were suitable as release papers for pressure sensitive adhesives.

EXAMPLE 7

The procedure of Example 3 was followed except that the 14.6 parts of dibutyltin diacetate solution were replaced by 20 parts of a 50 percent solution of dibutyltin dibenzoate in toluene. The composition obtained had an N/Sn atomic ratio of 3.5:1. This composition when coated on vegetable parchment and cured in the manner described in Example 1 gave a film which was very resistant to rubbing and had good release properties for pressure sensitive adhesives.

EXAMPLE 8

The procedure of Example 3 was repeated except that 20 parts of a 50 percent solution in toluene of the diorganotin compound prepared as described below were used in place of the 14.6 parts of dibutyltin diacetate solution. Excluding the nitrogen of the oximo group the composition so obtained had an N/Sn atomic ratio of 3.5:1. This composition when coated on vegetable parchment and cured in the manner described in Example 1 gave a film which was very resistant to rubbing and had good release properties for pressure sensitive adhesives.

The diorganotin compound was prepared by heating together under reflux for 2 hours, 12.5 parts of dibutyltin oxide, 12.1 parts of benzaldoxime and 24.6 parts of toluene. During the reaction the water formed was removed in the form of its azeotrope with toluene and the toluene returned to the reaction mixture. The dibutyltin oxide slowly passed into solution and 0.8 part of water was collected (the theoretical quantity of water for the formation of the diorganodibutyltin compound $$Bu_2Sn(ON=CHPh)_2$$

is 0.9 part). The toluene content of the solution was adjusted to give a 50 percent solution of the tin compound.

EXAMPLE 9

12 parts of the organotin compound solution prepared as described below and 5 parts of a 10 percent solution of tetraethylenepentamine in toluene were added to a solution of 100 parts of the hydroxyl-containing dimethylpolysiloxane and 6 parts of the methylhydrogenpolysiloxane used in Example 1 in 1300 parts of toluene. The composition so obtained had an N/Sn atomic ratio of 0.9:1. Coatings obtained by treating vegetable parchment with the so obtained solution and curing the composition in the manner described in Example 1 were extremely resistant to abrasion by rubbing with a finger and provided excellent release of pressure sensitive adhesives.

The organotin compound solution was prepared by heating together under reflux for 2 hours, 100 parts of dibutyltin oxide, 24 parts of acetic acid and 120 parts of toluene, removing the water formed as an azeotrope with toluene and returning the toluene from the azeotrope to the reaction mixture. 4.0 parts of water were removed (in the theoretical case of the reaction illustrated $$2Bu_2SnO + 2MeCO_2H \rightarrow MeCO.OSnBu_2OSnBu_2OCOMe + H_2O$$

3.6 pars of water should be released).

EXAMPLE 10

20 parts of a 50 percent solution of dibutyltin diphenoxide prepared as described below were added to a solution of 2 parts of tetraethylenepentamine and 100 parts of the hydroxyl-containing dimethylpolysiloxane and 6 parts of the methylhydrogensiloxane used in Example 1 in 1300 parts of toluene. The composition so obtained had an N/Sn atomic ratio of 2.9:1. When coated on vegetable parchment and cured in the manner described in Example 1, the film obtained showed a slight smear on rubbing immediately after removing from the hot oven. This smear, however, disappeared rapidly on standing at 20° C. and the coating became abrasion resistant and had good release properties for pressure sensitive adhesives.

The solution of dibutyltin diphenoxide was prepared by heating together under reflux for 2 hours, 25 parts of dibutyltin oxide, 18.8 parts of phenol and 43.9 parts of toluene. The water formed was removed as its azeotrope with toluene, the toluene being returned to the reaction mixture. 1.5 parts of water were collected. (The quantity of water in the theoretical reaction $$Bu_2SnO + 2PhOH \rightarrow Bu_2Sn(OPh)_2 + H_2O$$

is 1.8 parts.)

EXAMPLE 11

Two solutions A and B were prepared as follows:

*Solution A.*—1.2 parts of a methylhydrogenpolysiloxane fluid of average composition $$Me_3SiO(SiHMeO)_{40}(SiMe_2O)_{58}SiMe_3$$

prepared by the cohydrolysis of a mixture of 1.75 parts of trimethylchlorosilane, 37.4 parts of methyldichlorosilane and 58 parts of dimethyldichlorosilane were dissolved in 50 parts of a 10 percent solution in toluene of the hydroxy-ended dimethylsiloxane used in Example 1.

*Solution B.*—0.3 part of a mixture of cyclic methylsiloxanes, $(MeSiHO)_{4-6}$, prepared by thermal cracking of the hydrolysis product of $MeHSiCl_2$, were dissolved in 50 parts of 10 percent solution in toluene of the hydroxy-ended dimethylsiloxane used in Example 1.

To each solution was added 0.3 part of a 10 percent toluene solution of tetraethylenepentamine and 4 parts of a 10 percent toluene solution of dibutyltin diacetate. Papers coated with these solutions and cured at 120° C. for 30 seconds were resistant to abrasion and gave excellent release of pressure sensitive adhesives.

EXAMPLE 12

Two solutions of similar composition to those of Example 1 were prepared except in that hydroxy-ended dimethylpolysiloxanes of viscosity 4,000 cs. and 60,000 cs. were used in place of that used in Example 1. Paper coated with these solutions and cured at 120° C. for 30 seconds was very resistant to abrasion by a finger and gave satisfactory release of pressure sensitive adhesives.

EXAMPLE 13

A solution of 8 parts of dibutyltin di-n-butoxide, 2 parts of tetraethylenepentamine, 100 parts of the hydroxy-ended dimethylpolysiloxane and 6 parts of the methylhydrogensiloxane used in Example 1 in 1300 parts of toluene was coated onto vegetable parchment and cured for 1 minute at 120° C. as in Example 1. The resulting coating was resistant to abrasion and had good release properties for pressure sensitive adhesives.

EXAMPLE 14

The procedure of Example 8 was repeated except that 20 parts of the 50 percent dibenzaldoximotetrabutyldistannoxane solution prepared as described below were used in place of the 20 parts of the solution of dibutyldibenzaldoximotin. When coated onto paper and cured as described in Example 1 the composition gave a coating with very good abrasion resistance and good release of pressure sensitive adhesives.

The organotin compound was prepared by heating under reflux 25 parts of dibutyltin oxide, 24.2 parts of benzaldoxime and 49.2 parts of toluene. 1.6 parts of water were removed as an azeotrope with toluene. The theoretical quantity of water expected from the equation below is 1.8 parts.

$$2Bu_2SnO + 2PhCH=NOH \rightarrow (PhCH=NO.SnBu_2)_2O$$

What we claim is:

1. Composition suitable for treatment of paper and the like comprising 100 parts by weight of a diorganopolysiloxane soluble in organic solvents and containing at least two silicon-bonded hydroxyl groups, 1 to 25 parts of a liquid polysiloxane of viscosity not greater than 2000 cs. at 25° C. and having not less than three silicon-bonded hydrogen atoms per molecule and at least three different silicon atoms therein having a hydrogen atom attached thereto, the organo groups in the siloxanes being selected from the group consisting of substituted or unsubstituted alkyl, aryl, aralkyl, alkaryl, alkenyl, cycloalkyl or cycloalkenyl groups, 2 to 20 parts by weight of an organotin compound soluble in organic solvents selected from the group consisting of diorganotin acylates in which the acyl group is derived from a monovalent acid and is a mononuclear aromatic group or an aliphatic group having not more than four carbon atoms, diorganotin alkoxides, diorganotin phenoxides, diorganodioximotins, dioximopolydiorganostannoxanes and dialkylpolydiorganostannoxanes, the organo groups therein being selected from the group consisting of alkyl and aryl groups, and from 0.2 to 15 parts by weight of an organic amine having a basic dissociation constant in aqueous solution of not less than $10^{-9}$.

2. A composition according to claim 1 wherein the organo groups in the diorganopolysiloxane are selected from the group consisting of methyl, ethyl, phenyl, benzyl, vinyl, cyclohexyl, trifluoropropyl and cyclohexenyl groups.

3. A composition according to claim 1 wherein the organo groups in the liquid polysiloxane are selected from the group consisting of methyl, ethyl and phenyl groups.

4. A composition according to claim 1 wherein the proportion of liquid polysiloxane containing silicon-bonded hydrogen atoms is from 2 to 15 parts by weight per 100 parts by weight of the diorganopolysiloxane.

5. A composition according to claim 1 wherein the organotin compound is present in amounts from 3 to 10 parts by weight per 100 parts by weight of the diorganopolysiloxane.

6. A composition according to claim 1 wherein the organo groups in the organotin compound are selected from the group consisting of n-butyl and n-octyl groups.

7. A composition according to claim 1 wherein the organotin compound is selected from the group consisting of diorganotin acylates and stannoxanes and the acyl groups are selected from the group consisting of formyl, acetyl, propionyl, benzoyl, monochloracetyl, monochlorobenzyl, phenylacetyl, crotonyl and cinnamoyl groups.

8. A composition according to claim 1 wherein the organotin compound is selected from the group consisting of dibutyltin diformate, dibutyltin diacetate, dibutyltin dipropionate, dibutyltin dibenzoate, dibutyltin diphenylacetate, dibutyltinbis(monochloroacetate), dibutyltin dicrotonate, dioctyltin diformate, dioctyltin diacetate, dioctyltin dipropionate, dioctyldibenzoate, dioctylpropionate, dioctyltin dibenzoate, dioctyltin diphenyl acetate, dioctyltinbis(monochloroacetate), dioctyltin dicrotonate, diacetoxytetrabutyldistannoxane, diacetoxytetraoctyldistannoxane, dibutyltin dimethoxide, dioctyltin dimethoxide, dibutyltindibutoxide, di-n-butyltin diphenojide, di-n-octyltin diphenoxide, dibutyldiphenaldoximotin, dioctyldibenzophenoximotin, dibutyldibenzaldoximotin and dioctyldibenzaldoximotin.

9. A composition according to claim 1 wherein the organotin compound is a diorganotin alkoxide and the alkoxy groups are selected from the group consisting of methoxy, ethoxy and n-butoxy groups.

10. A composition according to claim 1 wherein the organotin compound is a diorganotin phenoxide and the penoxy groups are selected from the group consisting of phenoxy, 4-chlorophenoxy and 4-methylphenoxy groups.

11. A composition according to claim 1 wherein the organotin compound is a diorganodioximotin and the oximo group is derived from an oxime selected from the group consisting of benzaldoxime, benzophenoxime, acetophenoxime, acetoxime and acetaldoxime.

12. A composition according to claim 1 wherein the amine is used in an amount from 0.5 to 10 parts by weight per 100 parts by weight of the diogranopolysiloxane.

13. A composition according to claim 1 wherein the amine is selected from the group consisting of methylamine, ethylamine, n-butylamine, diethylamine, triethylamine, n-octylamine, benzylamine, allylamine, 2-aminoethanol, 2-aminopropanol, 2-aminobutanol, triethanolamine, ethylenediamine, diethylenetriamine, triethylenediamine, triethylenetetramine, tetraethylenepentamine, N,N - diethylhydroxylamine and N,N - dimethylaminoethanol.

14. A composition according to claim 1 wherein there is present a solvent in amount such that the concentration of the composition therein is from 1 to 30 percent by weight of the total weight.

15. A composition according to claim 1 wherein the amine is used in amount from 0.5 to 10 parts by weight per 100 parts by weight of the diorganopolysiloxane.

16. A composition according to claim 1 wherein the atomic ratio of nitrogen in the amine to tin in the organotin compound is between 0.1:1 to 5:1.

17. Composition suitable for treatment of paper and the like comprising 100 parts by weight of a diorganopolysiloxane soluble in organic solvents and containing at least two silicon-bonded hydroxyl groups, 1 to 25 parts of a liquid polysiloxane of viscosity not greater than 2000 cs. at 25° C. and having not less than three silicon-bonded hydrogen atoms per molecule and at least three different silicon atoms therein having a hydrogen atom attached thereto, the organo groups being selected from the group consisting of substituted or unsubstituted alkyl, aryl, aralkyl, alkaryl, alkenyl, cycloalkyl or cycloalkenyl groups, 2 to 20 parts by weight of an organotin compound soluble in organic solvents selected from the group consisting of diorganotin alkoxides where the alkoxy group contains not more than 10 carbon atoms, diorganotin phenoxide where the phenoxy groups are phenoxy, 4-chlorophenoxy and 4-methylphenoxy groups, and diorganodioximotin or a dioximopolydiorganostannoxane and the oximo groups is derived from benzaldoxime, benzophenoxime, acetophenoxime, acetoxime or acetaldoxime, and from 0.2 to 15 parts by weight of an amine having a basic dissociation constant in aqueous solution of not less than $10^{-9}$.

18. A composition according to claim 16 wherein the alkoxy groups are methoxy, ethoxy or n-butoxy groups.

19. A composition according to claim 18 wherein the diorganotin alkoxide is dibutyltin dimethoxide, dioctyltin dimethoxide or dibutyltin dibutoxide.

20. A composition according to claim 16 wherein the organotin compound is di-n-butyltin diphenoxide or di-n-octyltin diphenoxide.

21. A composition according to claim 16 wherein the organotin compound is dibutyldibenzaldoximotin, dioctyldibenzophenoximotin, dibutyldibenzaldoximotin or dioctyldibenzaldoximotin.

22. A composition according to claim 16 wherein the amine is methylamine, ethylamine, n-butylamine, diethylamine, triethylamine, n-octylamine, benzylamine, allylamine, 2-aminoethanol, 2-aminopropanol, 2-aminobutanol, triethanolamine, ethylenediamine, diethylenetriamine, triethylenediamine, triethylenetetramine, tetraethylenepentamine, trimethyl-γ-aminopropylsilane, trimethyl-δ-aminobutylsilane, N,N-diethylhydroxylamine or N,N-dimethylaminoethanol.

References Cited
UNITED STATES PATENTS 3,061,567    10/1962    Keil _____ 117—155
3,436,251    4/1969    Rees _____ 117—155

MORRIS LIEBMAN, Primary Examiner

L. T. JACOBS, Assistant Examiner

U.S. Cl. X.R.

260—32.8, 33.6, 33.8, 46.5